United States Patent [19]

Factor

[11] 4,403,008
[45] Sep. 6, 1983

[54] FLEXIBLE CELL PLUGGING MASK FOR USE IN FABRICATING PARTICULATE FILTERS

[75] Inventor: James R. Factor, Durand, Mich.

[73] Assignee: General Motors Corporation, Detroit, Mich.

[21] Appl. No.: 356,174

[22] Filed: Mar. 8, 1982

[51] Int. Cl.³ .............................................. B32B 3/12
[52] U.S. Cl. .................................... 428/117; 428/138; 428/188
[58] Field of Search ............... 425/DIG. 44; 428/117, 428/119, 116, 138, 188; 252/455 R, 477 R

[56] References Cited

U.S. PATENT DOCUMENTS

| | | | |
|---|---|---|---|
| 2,810,672 | 10/1957 | Taylor | 428/138 |
| 3,954,672 | 5/1976 | Somers et al. | 252/455 R |
| 4,276,071 | 6/1981 | Outland | 428/116 X |
| 4,293,357 | 10/1981 | Higuchi et al. | 428/116 X |
| 4,329,162 | 5/1982 | Pitcher, Jr. | 428/117 X |
| 4,340,403 | 7/1982 | Higuchi et al. | 428/117 X |
| 4,361,614 | 11/1982 | Moffitt, Jr. | 428/138 |

Primary Examiner—Henry F. Epstein
Attorney, Agent, or Firm—Arthur N. Krein

[57] ABSTRACT

A flexible mask, used to plug with a cement material alternate passages in a honeycomb matrix structure whereby it can be used as a diesel particulate filter, has a base with spaced apart pins extending therefrom to fit into alternate cells of the honeycomb matrix, the base being provided with through apertures positioned intermediate adjacent associate pins for alignment with the other cells through which the cement material can be forced to plug the end of these cell openings.

2 Claims, 4 Drawing Figures

FLEXIBLE CELL PLUGGING MASK FOR USE IN FABRICATING PARTICULATE FILTERS

TECHNICAL FIELD

This invention relates to exhaust particulate filters for use in the exhaust systems of diesel engines and the like and, in particular, to a flexible mask for use in plugging alternate cell openings in a ceramic, honeycomb structure to effect fabrication of a particulate trap.

BACKGROUND OF THE INVENTION

Considerable interest has recently been focused on the problem of limiting the mass of particulate matter emitted with the exhaust gases from diesel and other internal combustion engines. In the case of diesel engines, a great deal of effort is currently being expended to develop practical and efficient devices and methods for reducing emissions of largely carbonaceous particulates in exhaust gases.

One method for accomplishing this is to provide a suitable particulate trap having at least one particulate filter therein in the exhaust system of a diesel engine with this filter being capable of efficiently trapping the particulates from the exhaust gases and also being adapted to be regenerated, as for example, by the in-place incineration of the trapped particulates.

One suitable particulate filter is a ceramic wall-flow monolith filter of the type as disclosed, for example, in U.S. Pat. No. 4,276,071 entitled Ceramic Filters for Diesel Exhaust Particulates issued June 30, 1981 to Robert J. Outland. Such a particulate filter is originally in the form of an extruded ceramic monolith having an outer wall interconnected by a large number of interlaced thin porous internal walls defining a plurality of substantially parallel cells. A first group of alternate cells are closed, as by a plug of cement material, at one end, while a second group of such cells are closed in a similar manner at the opposite end whereby to define inlet and outlet passages, respectively.

Due to the method of manufacture of the monolith which is first extruded and then fired, the matrix of cells in the extrusion, after being fired, are not dimensionally the same from monolith to monolith making multiple cell plugging difficult. Accordingly, and as disclosed in the above-identified U.S. Pat. No. 4,276,071, the plug of cement material has been applied one cell at a time as by means of a hypodermic needle-like plunger.

SUMMARY OF THE INVENTION

It is therefore the primary object of this invention to provide a mask for use in plugging alternate cells in the end of a ceramic monolith with a cement material to facilitate the manufacture of a particulate filter.

Accordingly, another object of the invention is to provide an improved mask for use in plugging alternate cells in the end of an extruded and fired ceramic monolith, the mask being made of a flexible elastomeric material and having a base with guide pin extending therefrom adapted to fit into alternate cells of the monolith, with holes in the base exposing the other cells whereby a plug of cement material can be forced into the exposed cells.

For a better understanding of the invention, as well as other objects and further features thereof, reference is had to the following detailed description of the invention to be read in connection with the accompany drawings.

DESCRIPTION OF A PREFERRED EMBODIMENT

Figure 1:
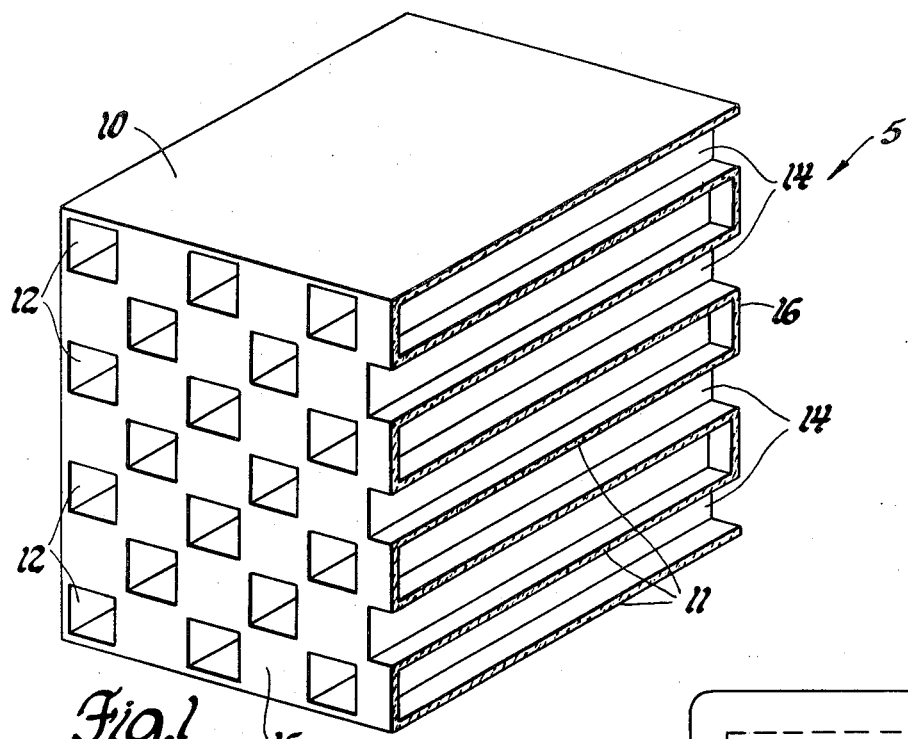
FIG. 1 is a pictorial view of a known particulate filter of the ceramic wall-flow monolith type.

Referring first to FIG. 1, there is illustrated a ceramic wall-flow monolith particulate filter, generally designated 5, of the type disclosed in the above-identified U.S. Pat. No. 4,276,071. The particulate filter 5 is in the form of a ceramic monolith having a surrounding outer wall 10, of any desired configuration, such as round, oval, rectangular or substantially square as illustrated. The outer wall 10 is internally interconnected by a large number of interlaced thin porous internal walls 11.

The interlaced walls 11 define internally thereof two groups of parallel cells or passages including respectively inlet passages 12 and outlet passages 14, each extending to opposite ends of the filter element 5. The inlet passages 12 are open at the inlet end 15 of the element and are closed at the outlet end 16 of the element, while the outlet passages 14 are closed at the element inlet end 15 and open at the outlet end 16.

In the FIG. 1 embodiment, the passages are of square cross section although, it will be apparent to those skilled in the art that numerous other configurations could be utilized as desired. Further, the inlet and outlet passages are arranged in vertical and horizontal rows (as viewed in cross section) with the inlet passages alternating with exhaust passages in a checkerboard pattern. Thus, it will be appreciated that each interior wall portion of the element lies between an inlet passage and an outlet passage at every point of its surface except where it engages another wall, as it does at the corners of the passages. So, except for the corner engagement, the inlet passages are spaced from one another by intervening outlet passages and vice versa.

The construction of the ceramic monolith is such that the interior walls 11 are porous so as to permit passage of exhaust gases through the walls from the inlet passages 12 to the outlet passages 14. The porosity of the walls is sized appropriately to filter out a substantial portion of the particulates present in diesel exhaust gases.

In order to withstand the operating and incineration temperatures and stresses placed on a ceramic particulate filter 5 under the normal operating conditions to which it is subjected, and, especially during the incineration of the particulates collected thereon, it is desirable that the particulate filter element be formed of a suitable ceramic material. While many such materials might be appropriate, it is preferred at the present to form the ceramic elements by first using materials and methods developed for forming ceramic monoliths for catalytic converters and the like which are described in U.S. Pat. No. 3,954,672 entitled Cordierite Refractory Compositions and Method of Forming Same issued May 4, 1976 to Somers, Berg and Shukle. This patent describes—particularly beginning in column 6, line 17, and extending to column 7, line 48—a preferred series of steps in the manufacturing process for the formation of extruded open-ended ceramic monoliths for use in catalytic converters and other devices.

Figure 2:
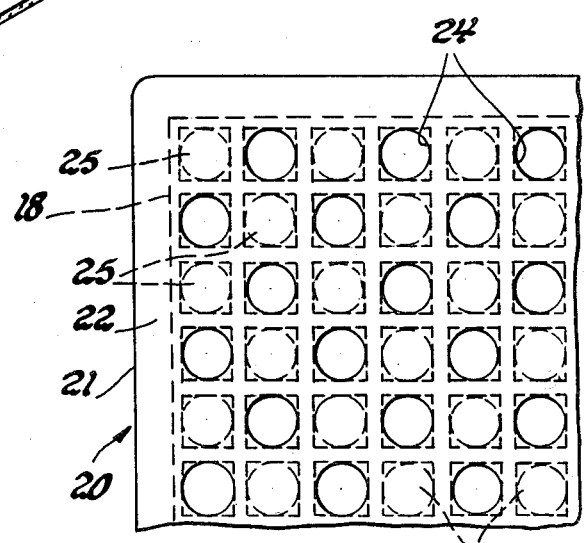
FIG. 2 is a pictorial view of a flexible cell plugging mask in accordance with the invention positioned on the face of a monolith honeycomb element.
Figure 3:
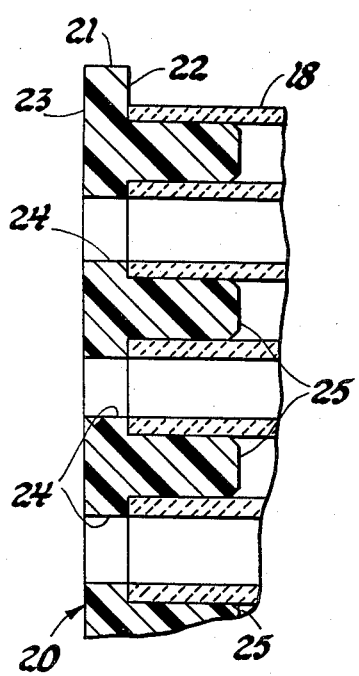
FIG. 3 is a fragmentary pictorial cross-sectional view of a portion of the mask of FIG. 2 with the pins thereof inserted into alternate cells at one end face of a monolith honeycomb element; and, FIG. 4 is a fragmentary pictorial schematic view of the blind side of the mask, per se, of FIG. 2.

Upon completion of these manufacturing steps, the open-ended monolithic structure 18, with reference to FIGS. 2 and 3, is converted to a filter element having alternate passages plugged, as previously described hereinabove, by closing the ends of alternate passages. This is done by depositing at those ends a suitable cement material to form the desired end closing walls and subsequently hardening the cement. The cement is preferably prepared by forming a mixture consisting of 71.5% milled cordierite based filler, prepared from ceramic material of the same type forming the monolith which has been ground and passed through a 100 mesh screen, and 28.5% collodial silica (30% solids in 70% water). The cement may be applied in any manner, such as for example with a hypodermic needle-like plunger, after which it is set by heating the cemented monolith in an oven for eight to ten hours at 200–220 degrees Fahrenheit and subsequently fully hardening the cement by heating at 1,000 degrees Fahrenheit for one-half hour. The milled cordierite based filler for the cement may be obtained from grinding up the bodies of scrap monoliths. The collodial silica is available from E. I. Du Pont de Nemours and Company, Inc., Industrial Chemicals Division, Wilmington, Delaware, under the name Ludox AS Collodial Silica (30% Solids).

Figure 4:
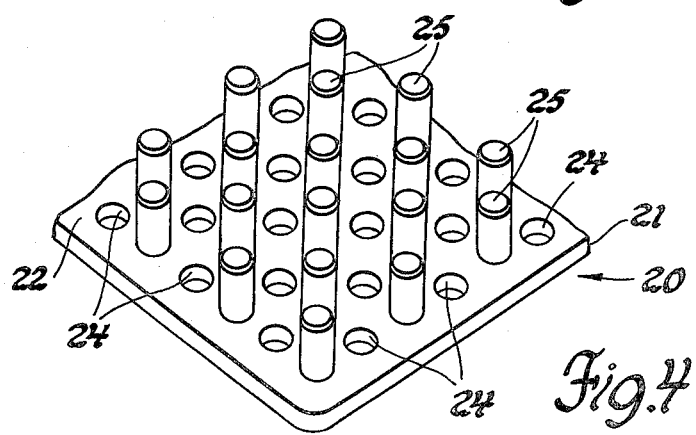

Now in accordance with the invention and as shown in FIGS. 2, 3 and 4, there is provided a flexible cell plugging mask, generally designated 20, which is adapted to facilitate the process of plugging alternate cells or passages at opposed face ends of an open-ended monolithic structure during the manufacture of a particulate trap.

The mask 20, made of a suitable flexible, elastomeric material, such as rubber, includes a base 21, of suitable configuration such as to conform to the external configuration of the external outer wall 10 of a monolithic element 18 used to fabricate a filter 5, having opposed blind and accessible surfaces 22 and 23, respectively, in terms of its use on a monolithic element and equally spaced apart apertures 24 extending therethrough.

Formed integral with base 21 are a plurality of equally spaced apart pins 25 which extend upward from the blind surface 22 and at right angles thereto, the pins 25 being located intermediate adjacent apertures 24. Preferably each pin 25 at its free end is either provided with a chamfer, as shown, or is otherwise suitably tapered to facilitate its entry and self-alignment into a cell or passage in an element 18. Thus the apertures 24 and pins 25 are arranged in vertical and horizontal rows (as viewed in FIG. 2) with the apertures 24 alternating with the pins 25 in a checkerboard pattern.

As should now be apparent, the spacing of the apertures 24 and pins 25 will be preselected so as to substantially correspond to the center to center spacing of the cells or passages in the monolithic element with which it is to be used and of course, the pins 25, per se, are of an appropriate size so as to be slidably received in an associate cell, as best seen in FIG. 3.

In operation, the mask 20 is positioned with the blind surface 22 facing an end of a monolithic element 18 and with a visible pin, such as an outboard pin 25, aligned with an associate outboard cell of the element and then the mask is moved in a direction whereby the pins 25 project into alternate cells in the manner shown in FIG. 3 until the blind surface abuts against the face end of the element 18.

With the mask 20 made of a flexible material, the pins 25 thereof are capable of conforming to cell to cell variations, which variations may occur when the extrusion is in a wet state or during firing of the monolithic element, and to thus operate to substantially center the apertures 24 over adjacent cells to be plugged.

With the mask 20 thus positioned, a suitable filler material, such as the cement material described hereinabove, can be forced in a suitable manner through the apertures 24 in the base 21 of the mask and into the exposed ends of the associate cells of a first group of cells thus plugging all the cells in the first group of cells where an aperture 24 exists in the mask. Of course this mask or a similar mask is then used to plug the second group of alternate cells at the opposite face end of the element 18.

It should be appreciated that each of the FIGS. 1 to 4, inclusive, are merely pictorial views and thus the illustrations of the cell openings and of the apertures and pins in the mask are greatly enlarged for purposes of illustration only. For example, in a particular embodiment of a particulate filter 5, the passages 12, 14 were defined by square cells measuring on the average about 0.06 inches on a side with a wall 11 thickness of about 0.015 inches between cells. For this arrangement, the associate mask 20 would be provided with the center to center spacing of the apertures 24 and pins 25 being about 0.075 inches and, of course, the center to center spacing of adjacent apertures or pins being about 0.15 inches. In addition, each of the apertures 24 would be sized correspondingly and each of the pins 25 would be appropriately sized accordingly for slidable entry into the associate cells.

Although in the construction illustrated in FIGS. 2 and 4, the apertures 24 are shown as being of circular configuration, these apertures could be of square configuration to allow the plug material, such as cement, to move through the mask base into the associate square shaped cell, as in the embodiment shown in FIG. 1, with less restriction.

Accordingly, it should be apparent to those skilled in the art that the application of the mask 20 of the invention is not limited to plugging monolithic elements with square cells or checkerboard type plugging patterns. By making a mask with the apertures and pins in appropriate shapes and spacings, various alternate monolithic element cell configurations can be plugged, as desired. Thus it is also possible to make the pins 25 of another shape than the round shape as seen in FIGS. 2 and 4.

This application is therefore intended to cover such modifications of changes as may come within the purposes of the invention as defined by the following claims.

The embodiments of the invention in which an exclusive property or privilege is claimed are defined as follows:

1. A mask for use in applying a filler material to plug alternate openings in an extruded ceramic monolith element during the fabrication of a particulate filter, the monolith element being of the type having a continuous outer wall internally interconnected by a large number of interlaced thin porous internal walls defining parallel passages extending longitudinally through the ceramic monolith element from opposite end faces thereof with the passages being of substantially uniform cross section and arranged in vertical and horizontal rows when viewed in elevation of a said end face thereof to define a honeycomb matrix; said mask, of flexible elastomeric material, includes a flat base member of a size and shape complementary to a said end face whereby it can be placed in abutment thereagainst, said base member having a plurality of flexible pins extending outward from one face thereof with said pins arranged in a checkerboard configuration, said pins being of a size and shape for insertion into alternate said passages, and having a plurality of apertures extending therethrough with said apertures arranged in a checkerboard configuration but offset relative to said pins, said apertures being of a size and shape corresponding substantially to the cross section of said passages whereby a filler material can be extruded therethrough into the associate aligned alternate passages of the monolith element whereby to effect blocking of that end of said passages.

2. A mask for use in the fabrication of a particulate filter, the mask being used to apply a filler material to plug alternate openings in an extruded ceramic monolith element of the type having a continuous outer wall internally interconnected by a large number of interlaced thin porous internal walls defining parallel passages extending longitudinally through the ceramic monolith element from opposite end faces thereof with the passages being of substantially uniform cross section and arranged in vertical and horizontal rows when viewed in elevation of a said end face thereof to define a honeycomb matrix; said mask, of flexible elastomeric material, includes a flat base member of a size and shape complementary to a said end face whereby it can be placed in abutment thereagainst, said base member having a plurality of equally spaced apart flexible pins extending outward from one face thereof with said pins arranged in a checkerboard configuration, said pins being of a size and shape for insertion into said passages, said base having a plurality of equally spaced apertures extending therethrough with said apertures arranged intermediate adjacent said pins, said apertures being of a size and shape whereby a filler material can be extruded therethrough into the associate aligned alternate passages of the monolith element whereby to effect blocking of that end of said passages.

* * * * *